United States Patent

Kotzbauer

[15] 3,681,492

[45] Aug. 1, 1972

[54] BACTERICIDAL STABILIZED ASCORBIC ACID COMPOSITION

[72] Inventor: Judith M. Kotzbauer, Cincinnati, Ohio

[73] Assignee: Allergan Pharmaceuticals, Santa Ana, Calif.

[22] Filed: Oct. 30, 1969

[21] Appl. No.: 871,769

Related U.S. Application Data

[63] Continuation of Ser. No. 526,339, Feb. 10, 1966, abandoned, which is a continuation-in-part of Ser. No. 383,495, July 17, 1964, abandoned.

[52] U.S. Cl. ............424/141, 210/64, 424/143, 424/280, 424/294, 424/319, 424/320, 424/324, 424/325, 424/330
[51] Int. Cl. ..............A61l 13/00, A61l 23/00
[58] Field of Search............................424/141, 280

[56] References Cited

UNITED STATES PATENTS 3,065,139   11/1962   Ericsson et al................424/141
3,092,552   6/1963   Romans.......................424/141

FOREIGN PATENTS OR APPLICATIONS 469,335   7/1937   Great Britain................424/280
752,547   7/1956   Great Britain................424/280

Primary Examiner—Albert T. Meyers
Assistant Examiner—Vera C. Clarke
Attorney—Fulwider, Patton, Rieber, Lee and Utecht

[57] ABSTRACT

Microbially active aqueous solutions of an ascorbic acid material have been prepared which have a prolonged microbicidal life. The aforesaid aqueous solution initially contains very small amounts of cupric ion (or sometimes cuprous ion), on the order of 25 to 50 micrograms per milliliter of aqueous solution, in the presence of at least a sufficient amount of a water-soluble amine or water-soluble ammonium salt, to complex the copper ions present, the first log stability constant ($k_1$) of the copper-amine complex and the copper-ammonium complex so formed in the aqueous solution lying in the range of between about 3 to 14 at a pH of beteween about 5 to 8.

1 Claim, No Drawings

BACTERICIDAL STABILIZED ASCORBIC ACID COMPOSITION

This application is a continuation of U.S. Pat. application Ser. No. 526,339, filed on Feb. 10, 1966, now abandoned, which in turn is a continuation-in-part of U.S. Pat. application, Ser. No. 383,495 filed July 17, 1964, now abandoned.

This invention relates to ascorbic acid and, more particularly, to the use of ascorbic acid as a microbicide and to a stabilized ascorbic acid composition and method of stabilizing.

It is known that an aqueous solution of ascorbic acid in the presence of copper and with the pH of the solution in the range of five to eight is an effective microbicide. Ascorbic acid alone apparently has no bactericidal properties and the material becomes active only in the presence of copper. Copper salts will serve to catalyze an auto-oxidation of ascorbic acid which provides the bactericidal materials. Both synthetic and natural ascorbic acids may be used. The different forms of ascorbic acid, including levo, dextro, and iso forms, are effective and the various salts of ascorbic acid such as sodium ascorbate and ascorbic acid esters and derivatives, e.g., ascorbyl palmitate and d-arabinoascorbic acid, are active. It has been found that dehydroascorbic acid is inactive. The dehydroascorbic acid has a carbonyl oxygen at carbon positions two and three and a single bond joining the two carbon atoms. The effective ascorbic acid materials contain an enediol group (-COH:COH-) and are generally characterized by having hydroxyl groups at carbon positions two and three and a double bond between the two carbon atoms. In ascorbic acid materials, the positions are customarily numbered from the end carbon atom, which is a member of the lactone ring and which is coupled to carbonyl oxygen.

The antimicrobial action of an activated ascorbic acid solution, that is, a solution containing ascorbic acid in the presence of a catalytic amount of copper and at a favorable pH, is of very limited duration. Normally, the solution will substantially lose its antimicrobial action within a matter of minutes or a few hours following the addition of a copper catalyst to the ascorbic acid solution. The catalytic auto-oxidation of the ascorbic acid is implicated in the antimicrobial action and is not therefore to be prevented completely but it would be desirable if an activated ascorbic acid solution could be stabilized or controlled to extend its effective life. It has been proposed heretofore to inhibit the oxidation of the ascorbic acid in the presence of copper by the addition of the well-known chelating agent, ethylenediamine tetraacetic acid. The latter chelating material completely protects the ascorbic acid against oxidation by tying up the copper and making it unavailable in its catalytic capacity and hence does not provide for a controlled or extended life of an activated ascorbic acid solution as desired for many applications.

It has now been found that bacterial active solutions of ascorbic acid, that is, ascorbic acid solutions containing copper, may be stabilized. That is to say, their effective antimicrobial life may be greatly lengthened by the use of nitrogenous compounds which are capable of complexing with the copper to form a complex characterized by having a log stability constant within the range of three to 14 and preferably within the more limited range of three to eight. Nitrogenous compounds of the foregoing description impart to an ascorbic-acid copper solution sufficient physical and chemical stability without destroying the bactericidal activity as is the case with strong chelating agents. For example, the aforementioned ethylenediamine tetraacetic acid which forms a complex having a log stability constant of in excess of 13 chelates copper ions, as the molecule has available six coordinating atoms, with subsequent inactivation of their catalytic effect on the auto oxidation of ascorbic acid. The copper complexing nitrogenous compounds of the invention provide the copper catalytic agent in a controlled fashion without interfering with the bacterial activity of the ascorbic acid.

Numerous nitrogenous compounds, generally water-soluble, are available for use in the process. Ammonium hydroxide added to an ascorbic acid-copper water solution slows the auto-oxidation of the ascorbic acid and greatly lengthens the effective bactericidal life of the solution. The nitrogenous materials which are employed in the invention are further characterized in behaving as Lewis bases in water solution. Basic amines forming complexes with log stability constants having values from three to eight are especially desirable as they will not only form copper complexes but may also be used for adjustment to the favorable pH range of five to eight. This pH adjustment is especially desirable where the solution is being used for the treatment of the eye, in which instance it is most important that the solution of the pH be close to 7.4 to allow for minimal irritation. In some applications, say where the activated ascorbic acid solution is being used to sterilize equipment, the pH of the solution may vary considerably from that desired for an ophthalmic product or a topically applied product. The composition and method of the invention are also useful for sterilizing water in remote areas removed from conventional water processing plants.

While basic amines are conveniently employed not only for their copper complexing ability but also for adjustment of pH of the ascorbic acid solution to an effective physiological pH range, it is possible to utilize various ammonium salts, e.g., ammonium chloride, or ammonium nitrate to obtain the desired copper complexing and to employ a suitable alkaline material, say, an alkali such as sodium hydroxide or potassium hydroxide, for pH adjustment.

In some applications, for instance, in ophthalmic products, where it is desirable to adjust the pH, say to within the range of 6.5 – 7.4, basic amines may be employed and in addition ammonium chloride is incorporated for isotonicity adjustment.

Both aliphatic and aromatic amines have demonstrated their ability to prolong the activity of an ascorbic acid and copper salt solution. Among the numerous aliphatic amines are the following:

Aliphatic Amines

| | |
|---|---|
| Monoethanolamine | Hexylamine |
| Diethanolamine | Diisopropylamine |
| Diisopropanolamine | Tributylamine |
| Diethylamine | Triethylamine |
| Propylamine | 1-amino-2-propanol |
| Isopropylamine | 2-ethylaminoethanol |
| Isobutylamine | 2-amino-2-methyl-1-propanol |
| Dipropylamine | 3-dimethylaminopropanol-1 |

Dibutylamine

Among the aromatic amines that have demonstrated stabilizing properties are:

Aromatic Amines

| Diphenylamine | p-aminophenol |
| m-aminophenol | aniline |
| o-aminophenol | N-methylaniline |
| | o-anisidine |

Heterocyclic amines such as pyridine have demonstrated the ability to protect the microbicidal activity of copper salt-ascorbic acid solution. Various amides, both aliphatic and aromatic, will prolong the microbicidal activity of activated ascorbic acid solution. Ammonium salts such as ammonium chloride are particularly desirable in some applications. It has been found that both aromatic and aliphatic amino acids prolong the microbicidal activity. The aliphatic amino acid, serine, is a particularly desirable material. Dimethylformamide, acetamide, and acetanilide are among the amides found effective. The aromatic amino acid, dl-phenylalanine, may be employed. Various copper salts including cupric chloride, cuprous chloride, cuprous sulfate, cuprous nitrate and cuprous acetate among others may be used as the catalyzing agent.

The expression "log stability constant" is a logarithmic expression of how strongly the copper and the nitrogenous compounds complex.

For example, Jannik Bjerrum (ref. J. Bjerrum, METAL AMMINE FORMATION IN AQUEOUS SOLUTION, P. Hasse and Son, Copenhagen, 1941), using pH measurements, determined the following stability constants for the copper ammonia complex, [Cu(NH$_3$)4b,]$^{++}$121 . Upon finding the successive stability constants by maintaining constant the copper ion concentration and increasing the concentration of ammonia, Bjerrum was able to calculate the over-all stability constant as 13.32 which is equal to the sum of the logs of the successive stability constants. However in the literature on metal complexes, generally only the first stability constant (log $k_1$) will be given or in the case of unidentate ligands (e.g. NH$_3$) the average stability constant is always referred to as the over-all stability constant divided by the number of ligands attached to the metal.

Successive formation (stability) constants:

$$Cu^{++} + NH_3 \leftrightarrows [Cu(NH_3)]^{++},$$

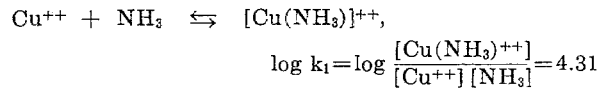

$$[Cu(NH_3)]^{++} + NH_3 \leftrightarrows [Cu(NH_3)_2]^{++},$$

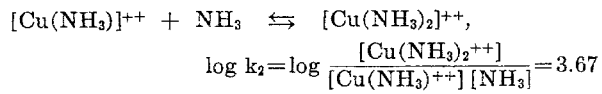

$$[Cu(NH_3)_2]^{++} + NH_3 \leftrightarrows [Cu(NH_3)_3]^{++},$$

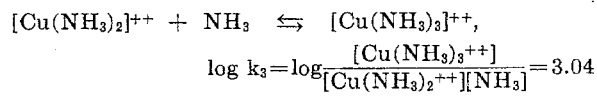

$$[Cu(NH_3)_3]^{++} + NH_3 \leftrightarrows [Cu(NH_3)_4]^{++},$$

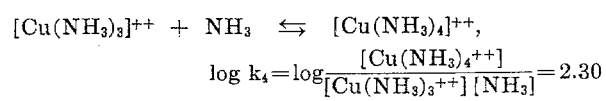

Over-all stability constant:

$$Cu^{++} + 4NH_3 \leftrightarrows [Cu(NH_3)_4]^{++},$$

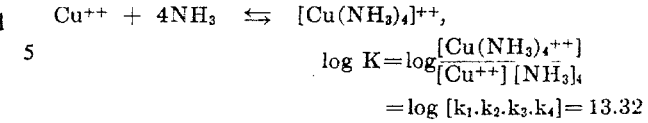

$$= \log [k_1 \cdot k_2 \cdot k_3 \cdot k_4] = 13.32$$

Average stability constant:

$$\log K/n^* = 3.33$$

\* n = number of ligands attached to metal e.g. n for Cu$^{++}$ in [Cu(NH$_3$)$_4$]$^{++}$ = 4

The ammonia base or basic amine materials which are employed in the invention for complexing with the copper catalyst include ammonia and water-soluble primary, secondary, and tertiary aliphatic amines. Among the water-soluble aliphatic amines that may be used are the following: ethylamine, propylamine, n-amylamine, t-amylamine, dimethylamine, diethylamine, dipropylamine, di-n-amylamine, di-t-amylamine, trimethylamine, triethylamine, tripropylamine and tri-n-amylamine, and various ones of the butyl amines.

The foregoing lists are not intended to be exclusive and the primary qualification for a suitable nitrogenous material is that it be a Lewis base in water solution and form a copper complex with a log stability constant within the range of three to 14 and preferably within the more narrow range of three to eight. The nitrogenous materials are generally water-soluble at least to some degree. Various hydroxyl amines, such as triethanolamine, diethanolamine, monoethanolamine, N-methyl ethanolamine, N-ethyl ethanolamine, N,N-dimethyl ethanolamine, N,N-diethyl ethanolamine, N-methyl diethanolamine, N,N-diisopropanolamine, ethanolamine, monoisopropanolamine, diisopropanolamine, triisopropanolamine, and tris (hydroxymethyl) aminomethane, may also be employed.

It is now believed that the effective bactericidal agent found in the water solution generally comprises a complex of three moieties, present in the ratio of 1:2:4, respectively, of an ascorbic moiety, a copper-containing moiety and a nitrogen-containing moiety, i.e., each molecule of the complex contains one molecule of the ascorbic compound, two molecules of the copper salt, and four molecules of the nitrogenous compound. In the preparation of a mixture of the three components or of an activated solution, it is not necessary that the three components be employed in the precise ratio set forth above. In some instances, the nitrogenous compound, e.g., a basic amine will be employed in an excess of the foregoing ratio to adjust the pH of the solution.

The ascorbic acid should be present in the aqueous solution in an amount at least 0.1 percent by weight. Ascorbic acid in concentrations of five percent and more has been employed but the preferred amount is about one percent ascorbic acid by weight. Desirably, the solution has a pH within the more limited range of 6.5 – 7.4.

The following formula was tested on the eyes of rabbits and found to have very slight or no irritation. The formula contained the following:

|  | Percent |
| --- | --- |
| Ascorbic Acid | 1 |
| Ammonium Chloride | 0.64 |
| Copper Sulfate Pentahydrate | 0.01 (25 $\mu$gm/ml Cu $^{++}$) |
| Merthiolate | 1:100,000 |
| Diethanolamine | 0.5 (Approx.) |
| Glass Distilled Water Q.S. Ad | 100 |

The following Table I is an account of one series of tests undertaken to investigate the usefulness of various basic amine materials in the stabilizing of ascorbic acid-copper aqueous solutions containing one percent ascorbic acid (vitamin C) and 0.01 percent copper sulfate pentahydrate. The table contains bacteriological assays of the various formulas using different amines for the indicated pH adjustments. Initially, all of the solutions were 100 percent bacteriologically active. The assays were run in the following fashion. The bacteria, in this case, *Staphylococcus aureus*, were placed in known volumes in the respective solutions and immediately a first sample was taken, plated, and a count made. Ten minutes later a sample was taken from each of the several solutions, plated and a second count taken. The difference in the number of bacteria reported is indicative of the effectiveness of the solution. A drop, say from $10^6$ to $10^2$ is indicative of a kill of around 99.99 percent. The foregoing drop from $10^6$ to $10^2$ is known as a four log kill which is indicative of a good bactericide. When the originally colorless solutions turn yellow the assays were made in some cases at that time and, as will be seen in the instance of ammonium hydroxide, the sample went off-color on the seventh day but, nevertheless, the solution exhibited exceptional bactericidal properties.

TABLE I.

| Amine | initial pH | temp. | age in days | color | assay 0 min. | 10 min. |
| --- | --- | --- | --- | --- | --- | --- |
| Ammonium Hydroxide | 7.4 | *R.T. | 7 | yellow | $6.3 \times 10^6$ | $1.0 \times 10^2$ |
| Diethanolamine | 6.5 | R.T. | 12 | yellow | $6.7 \times 10^6$ | $9.5 \times 10^4$ |
| Diethylamine | 7.0 | R.T. | 6 | yellow | $7.0 \times 10^6$ | $2.0 \times 10^2$ |
| Monoethanolamine | 7.0 | R.T. | 8 | yellow | $7.3 \times 10^6$ | $5.0 \times 10^2$ |
| Diethanolamine | 7.0 | R.T. | 12 | yellow | $7.3 \times 10^6$ | $1.0 \times 10^3$ |
| Monoethanolamine | 6.5 | R.T. | 7 | clear | $7.0 \times 10^6$ | $1.0 \times 10^3$ |
| Diethanolamine | 6.5 | 4°C. | 12 | clear | $6.9 \times 10^6$ | $1.0 \times 10^2$ |
| Monoethanolamine | 6.5 | 4°C. | 7 | clear | $6.1 \times 10^6$ | $7.0 \times 10^2$ |
| Diethanolamine | 7.4 | 4°C. | 12 | clear | $7.6 \times 10^6$ | $1.3 \times 10^3$ |
| Diethanolamine | 7.0 | 4°C. | 12 | clear | $5.0 \times 10^6$ | $4.4 \times 10^3$ |

*Room Temperature
NOTE: Due to the lack of available material at the time of investigation of Table I, only initial assays (100% activity) could be performed on the following amines: diisopropanolamine, triethanolamine, and tris (hydroxy-methyl) aminomethane. A later series revealed results similar to those given above in Table I.

The following Tables IIA and IIB are chemical and bacterial assay reports of ascorbic acid-copper aqueous solutions prepared using diethanolamine, with the amine being added in the amount required to give the initial pH's indicated. Ascorbic acid was present in an amount of 1 percent by weight and the copper was in the form of copper sulfate pentahydrate in an amount of 0.01 weight percent. The two tables show the chemical and bacterial assays of the samples which were refrigerated at 4° C. but removed from refrigeration to room temperature for the hours indicated each day. The assays of Table IIA were taken after eleven days and those of Table IIB were made on the nineteenth day. The samples were unopened throughout the test period.

TABLE IIA.

| initial pH | hrs/day at *R.T. | age in days | color | pH | bactericidal assay 0 min. | 10 min. |
| --- | --- | --- | --- | --- | --- | --- |
| 7.4 | 2 | 11 | **v.sl.yellow | 6.7 | $4.0 \times 10^6$ | $7.0 \times 10^2$ |
| 7.4 | 4 | 11 | v.sl.yellow | 5.9 | $3 \times 10^6$ | $<1 \times 10^2$ |
| 7.4 | 6 | 11 | v.sl.yellow | 6.7 | $5.5 \times 10^6$ | $2.5 \times 10^2$ |
| 7.4 | 8 | 11 | v.sl.yellow | 7.4 | $4.2 \times 10^6$ | $1.0 \times 10^2$ |
| 7.0 | 2 | 11 | clear | 6.7 | $3.8 \times 10^6$ | $< 1.0 \times 10^2$ |
| 7.0 | 4 | 11 | clear | 6.6 | $4.0 \times 10^6$ | $<1.0 \times 10^2$ |
| 7.0 | 6 | 11 | clear | 6.8 | $4.0 \times 10^6$ | $3.5 \times 10^3$ |
| 7.0 | 8 | 11 | clear | 5.6 | $5.0 \times 10^6$ | $<1.0 \times 10^2$ |
| 6.5 | 2 | 11 | clear | 6.0 | $4.5 \times 10^6$ | $<1.0 \times 10^2$ |
| 6.5 | 4 | 11 | clear | 6.5 | $3.6 \times 10^6$ | $\approx 1.0 \times 10^2$ |
| 6.5 | 6 | 11 | clear | 6.5 | $5.0 \times 10^6$ | $2.0 \times 10^2$ |
| 6.5 | 8 | 11 | clear | 6.4 | $3.5 \times 10^6$ | $<1.0 \times 10^2$ |

*Room Temperature
**Very slightly yellow

TABLE IIIA.**

| initial pH | hrs/day at *R.T. | chemical assay % retention | pH | bactericidal assay 0 min. | 10 min. |
| --- | --- | --- | --- | --- | --- |
| 7.4 | 2 | 56.8 | 6.2 | $6.7 \times 10^6$ | $<1.0 \times 10^2$ |
| 7.4 | 4 | 43.6 | 6.3 | $7.5 \times 10^6$ | $1.6 \times 10^3$ |
| 7.4 | 6 | 85.4 | 6.7 | $7.3 \times 10^6$ | $\approx 1.0 \times 10^2$ |
| 7.4 | 8 | 67.8 | 6.0 | $7.5 \times 10^6$ | $\approx 1.0 \times 10^2$ |
| 7.0 | 2 | 59.0 | 5.9 | $5.7 \times 10^6$ | $\approx 1.0 \times 10^2$ |
| 7.0 | 4 | 76.6 | 6.4 | $7.6 \times 10^6$ | $\approx 2.0 \times 10^2$ |
| 7.0 | 6 | 70.0 | 6.1 | $6.0 \times 10^6$ | $5.0 \times 10^2$ |
| 7.0 | 8 | 85.4 | 6.6 | $6.3 \times 10^6$ | $\approx 1.0 \times 10^2$ |
| 6.5 | 2 | 34.8 | 5.3 | $6.7 \times 10^6$ | $4.0 \times 10^3$ |
| 6.5 | 4 | 59.0 | 5.6 | $4.6 \times 10^6$ | $\approx 1.0 \times 10^2$ |
| 6.5 | 6 | 76.6 | 6.0 | $6.3 \times 10^6$ | $\approx 1.0 \times 10^2$ |
| 6.5 | 8 | 78.8 | 6.1 | $5.5 \times 10^6$ | $<1.0 \times 10^2$ |

*Room temperature
**Aerated Three Times Per Day

TABLE IIIB.**

| initial pH | hrs/day at *R.T. | chemical assay % retention | pH | bactericidal assay 0 min. | 10 min. |
| --- | --- | --- | --- | --- | --- |
| 7.4 | 2 | 56.9 | 6.0 | $6.7 \times 10^6$ | $<1 \times 10^2$ |
| 7.4 | 4 | 61.7 | 6.0 | $9.0 \times 10^6$ | $\approx 1 \times 10^2$ |
| 7.4 | 6 | 34.9 | 5.5 | $8.5 \times 10^6$ | $\cong 1 \times 10^2$ |
| 7.4 | 8 | 39.8 | 5.6 | $9.2 \times 10^6$ | $9.0 \times 10^2$ |
| 7.0 | 2 | 74.7 | 6.2 | $7.0 \times 10^6$ | $<1 \times 10^2$ |
| 7.0 | 4 | 89.5 | 6.3 | $9.2 \times 10^6$ | $<1 \times 10^2$ |
| 7.0 | 6 | 84.8 | 6.2 | $8.5 \times 10^6$ | $<1 \times 10^2$ |
| 7.0 | 8 | 93.6 | 6.3 | $7.5 \times 10^6$ | $<1 \times 10^2$ |
| 6.5 | 2 | 70.0 | 5.9 | $6.0 \times 10^6$ | $2.9 \times 10^3$ |
| 6.5 | 4 | 18.2 | 5.0 | $7.1 \times 10^6$ | $4.0 \times 10^2$ |
| 6.5 | 6 | 69.0 | 6.0 | $7.0 \times 10^6$ | $<1.0 \times 10^2$ |
| 6.5 | 8 | 39.1 | 6.0 | $6.6 \times 10^6$ | $<1.0 \times 10^2$ |

*Room Temperature
**Aerated Three Times Per Day

TABLE IIIB.**

| initial pH | hrs/day at *R.T. | chemical assay % retention | pH | bactericidal assay 0 min. | 10 min. |
| --- | --- | --- | --- | --- | --- |
| 7.4 | 2 | 56.9 | 6.0 | $6.7 \times 10^6$ | $<1 \times 10^2$ |
| 7.4 | 4 | 61.7 | 6.0 | $9.0 \times 10^6$ | $\approx 1 \times 10^2$ |
| 7.4 | 6 | 34.9 | 5.5 | $8.5 \times 10^6$ | $\cong 1 \times 10^2$ |
| 7.4 | 8 | 39.8 | 5.6 | $9.2 \times 10^6$ | $9.0 \times 10^2$ |
| 7.0 | 2 | 74.7 | 6.2 | $7.0 \times 10^6$ | $<1 \times 10^2$ |
| 7.0 | 4 | 89.5 | 6.3 | $9.2 \times 10^6$ | $<1 \times 10^2$ |
| 7.0 | 6 | 84.8 | 6.2 | $8.5 \times 10^6$ | $<1 \times 10^2$ |
| 7.0 | 8 | 93.6 | 6.3 | $7.5 \times 10^6$ | $<1 \times 10^2$ |
| 6.5 | 2 | 70.0 | 5.9 | $6.0 \times 10^6$ | $2.9 \times 10^3$ |
| 6.5 | 4 | 18.2 | 5.0 | $7.1 \times 10^6$ | $4.0 \times 10^2$ |
| 6.5 | 6 | 69.0 | 6.0 | $7.0 \times 10^6$ | $<1.0 \times 10^2$ |
| 6.5 | 8 | 39.1 | 6.0 | $6.6 \times 10^6$ | $<1.0 \times 10^2$ |

*Room Temperature
**Aerated Three Times Per Day

The work reported in Tables IIIA and IIIB is similar to the work reported in Tables IIA and IIB with the difference being that Tables IIIA and IIIB are indicative of "aerated" samples. By the term "aerated" it is meant that approximately 0.2 cc were removed from each sample three times per day, that is, every two hours. The solutions used in the work reported in Tables IIIA and IIIB employed the same ascorbic acid solution described regarding Tables IIA and IIB and likewise used diethanolamine for the indicated pH adjustments. The assays were run over a period of eleven to twelve days from the date of preparation in the instance of Table IIIA. In Table IIIB, the assays were run over a period of 19 to 21 days from date of preparation. In the instance of the samples of Table IIIA, all were very slightly yellow colored at the end of the test period with the exception of the sample having an initial pH of 6.5, which sample wash held at room temperature for only two hours per day. The latter sample was somewhat darker than the others. In the instances of the samples of Table IIIB, all were very slightly yellow colored.

The term "log stability constant" unless otherwise indicated is used throughout the foregoing specification and in the claims following to define the first stability constant as is the general practice in the metal complex literature or as in the case of unidentate ligands the term refers to the average stability constant calculated by dividing the over-all stability constant by the number of ligands attached to the metal. The log stability constant ranges employed herein are referenced to 30° C.

EXAMPLE I

This example demonstrates that a combination of ascorbic acid and a copper-salt is unstable without the presence of a nitrogenous compound. The following solutions were prepared:

Solution 1 - a 1.0 percent solution of ascorbic acid was made in distilled water. The pH was adjusted to 7.0 with 1.0N NaOH. Final volume = 100ml. To this solution 50 $\mu$g of $Cu^{++}$ per ml was added. The solution immediately turned dark yellow and a green precipitate was formed.

Solution 2 - a 1.0 percent solution of ascorbic acid was made in distilled water. To this solution 0.75 percent sodium acetate was added. The pH was adjusted to 7.0 with 1.0N NaOH. Final volume = 100 ml. To this solution 50 $\mu$g of $Cy^{++}$ per ml was added. The solution immediately turned yellow and a yellow precipitate was formed.

Solution 3 - a 1.0 percent solution of ascorbic acid was made in distilled water. To this solution 0.36 percent $NH_4Cl$ was added. The pH was adjusted to 7.0 with 1.0N NaOH. Final volume = 100 ml. To this solution 50 $\mu$g of $Cu^{++}$ per ml was added. The solution turned slightly blue. No precipitate was formed.

Portions of solutions 1 and 2 were filtered through 0.45 $\mu$ millipore filters prior to testing to obtain a clear solution. The filtered samples were handled in the routine fashion to test for cidal activity. Solution 3 was tested without filtration. To 1.0 ml of each of the solutions was added 0.1 ml of a suspension of *Staphylococcus aureus*. The mixtures were allowed to stand for 10 minutes. Appropriate dilutions were plated on heart infusion agar plates to determine surviving bacteria. From the accompanying Table IV it can be seen that Solution 3 containing the amine shows much greater activity than Solutions 1 and 2. In addition, the activity of Solution 3 is maintained while that of Solutions 1 and 2 shows a decrease along with the immediate visible evidence of decomposition.

TABLE IV

Comparison of Solution Age and Cidal Activity

| Sample | 0 Time | 2 Hrs | 4 Hrs | 6 Hrs | 22 Hrs |
| --- | --- | --- | --- | --- | --- |
| 1 | $7.6 \times 10^3$/ml | $4.6 \times 10^4$/ml | $1.1 \times 10^5$/ml | $5.5 \times 10^4$/ml | $1.0 \times 10^4$/ml |
| 2 | $4.6 \times 10^5$/ml | $3.8 \times 10^4$/ml | $1.3 \times 10^5$/ml | $1.2 \times 10^5$/ml | $1.4 \times 10^5$/ml |
| 3 | $<1.0 \times 10^2$/ml | $<1.0 \times 10^2$/ml | $<1.0 \times 10^2$/ml | $<1.0 \times 10^2$/ml | $<1.0 \times 10^2$/ml |
| 4 | $3.0 \times 10^7$/ml | $3.0 \times 10^7$/ml | $3.0 \times 10^7$/ml | $3.0 \times 10^7$/ml | $3.0 \times 10^7$/ml |

Sample 1 = ascorbic - Cu++
Sample 2 = ascorbic - Cu++ - acetate
Sample 3 = ascorbic - Cu++ - $NH_4Cl$
Sample 4 = Bacteria viability control i.e., number bacteria added to each sample.

In the following examples, the bactericidal activities were not followed beyond the indicated lengths of time. The solutions containing the nitrogenous materials for the most part exhibited a four log kill at the times indicated.

EXAMPLE II

A one percent solution of ascorbic acid was made in distilled water. To this solution 1.2 percent acetanilide by weight was added, and the pH was adjusted to seven with one normal sodium hydroxide. To the aqueous solution, 0.01 percent of cuprous chloride (copper ion concentration of 47.5 Jug/ml) was added. The solution demonstrated definite bactericidal effect for periods in excess of 92 hours.

EXAMPLE III

A one percent solution of ascorbic acid was prepared in distilled water and to this solution 1.1 percent serine was added. The pH was adjusted to about seven with sodium hydroxide. To this solution about 0.02 percent of cuprous acetate (copper ion concentration of 70 μg/ml) was added. Definite microbicidal activity was present in excess of 120 hours.

EXAMPLE IV

Again a one percent solution of ascorbic acid was prepared, to which one percent of p-phenylenediamine was added, along with 0.01 percent of cupric sulfate pentahydrate (copper ion concentration of 25 μg/ml). The pH was adjusted to seven. The solution exhibited definite bactericidal properties in excess of 96 hours.

EXAMPLE V

A one percent solution of the ascorbic acid was prepared in distilled water and to this solution 1.1 percent of alanine was added. The pH was adjusted to seven with sodium hydroxide. Cupric sulfate (copper ion concentration of 39 μg/ml) was added to the solution in an amount of about 0.01%. The solution exhibited definite bactericidal activity in excess of 91 hours.

EXAMPLE VI

A 1.5 percent solution of ascorbic acid was prepared in distilled water. To this solution 1.2 percent of o-aminophenol was added, following which the pH was adjusted to seven with 1 N sodium hydroxide. Cuprous chloride (copper ion concentration of 127 μg/ml) in an amount of 0.02 percent was added to the solution. The solution exhibited bactericidal activity in excess of 50 hours.

EXAMPLE VII

A 1.2 percent solution of ascorbic acid in water was prepared. Alanine in an amount of 1.3 percent was added to the solution, after which the pH was adjusted to seven. Cupric chloride (copper ion concentration of 92 μg/ml) in an amount of 0.02 percent was added to the solution. The solution showed bactericidal activity in excess of 50 hours.

EXAMPLE VIII

A 1.2 percent solution of ascorbic acid was prepared in distilled water and to this solution 1.3 percent of p-aminophenol was added. The pH was adjusted to seven with 1 N sodium hydroxide. To this solution approximately 0.02 percent of cuprous chloride (copper ion concentration of 125 μg/ml) was added. The solution exhibited bactericidal activity in excess of 50 hours.

EXAMPLE IX

Ascorbic acid was placed in aqueous solution in an amount of one percent and to this solution 0.75 percent of acetamide was added. The pH was adjusted to seven with 1 N sodium hydroxide and cupric sulfate pentahydrate (copper ion concentration of 25 μg/ml) in an amount of 0.01% was added to the solution. The solution was bactericidal active in excess of 60 hours.

EXAMPLE X

Ascorbic acid in an amount of one percent was placed in distilled water. dl-phenylalanine was placed in the solution in an amount of 1.1 percent along with 0.02 percent of cupric chloride (copper ion concentration of 92 μg/ml). The pH was adjusted to seven. The solution was bactericidally active in excess of 50 hours.

EXAMPLE XI

Ascorbic acid in an amount of 1.0 percent was placed in solution of distilled water. Dimethylformamide was added in the amount of 0.64 percent. The pH was adjusted to seven and cuprous chloride (copper ion concentration of 62.5 μg/ml) in an amount of 0.01 percent added. The solution possesses bactericidal activity in excess of 40 hours.

EXAMPLE XII

Ascorbyl palmitate in an amount of 1.4 percent was placed in distilled water and to this solution the heterocyclic amine, pyridine, was added in an amount of 1 percent. The pH was adjusted to seven. To this solution cupric sulfate pentahydrate (copper ion concentration of 25 μg/ml) in an amount of 0.01 percent was added. The solution exhibited bactericidal activity in excess of 50 hours.

EXAMPLE XIII

Sodium ascorbate in an amount of 1 percent was placed in aqueous solution and to this solution o-anisidine was added in an amount of 1.1 percent. The solution had its pH adjusted to seven. Cupric chloride (copper ion concentration of 92 μg/ml) was added to the solution in an amount of 0.02 percent. The solution exhibited bactericidal activity in excess of 60 hours.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:

1. A bactericidal aqueous solution of pH of between five and eight which comprises, in combination:
   a. a member selected from the class consisting of ascorbic acid, ascorbyl palmitate, sodium ascorbate and d-arabinoascorbic acid present in said aqueous solution in an amount between 0.1 to about 5.0 percent, by weight, of said solution;
   b. an ionizable copper salt furnishing ions of copper in an amount of between 25 and 127 micrograms copper ion per milliliter of aqueous solution; and
   c. a compound selected from the group consisting of a water-soluble amine, alanine, dl-phenylalanine, serine, acetanilide, acetamide, dimethylformamide, o-anisidine, ammonium chloride, and ammonium nitrate, which forms a copper complex, with said copper ion, having a log stability constant of between three and 14 at said pH of between five and eight, said solution being combined in a molecular ratio of $(a):(b):(c)$ of about 1:2:4.

* * * * *